(12) United States Patent
Lin et al.

(10) Patent No.: US 8,184,105 B2
(45) Date of Patent: May 22, 2012

(54) TOUCH PANEL

(75) Inventors: Yu-Chuan Lin, Hsinchu County (TW); Sheng-Fa Liu, Hsinchu County (TW); Jing-Tin Kuo, Taipei (TW); Hsin-Hung Lee, Hsinchu (TW); Wei-Jen Chang, Yilan County (TW); Pei-Yu Chen, Miaoli County (TW); Yu-Mei Chiu, Yilan County (TW); Mei-Sheng Ma, Taipei (TW); Kuo-Hsing Cheng, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 217 days.

(21) Appl. No.: 12/629,058

(22) Filed: Dec. 2, 2009

(65) Prior Publication Data

US 2011/0057887 A1 Mar. 10, 2011

(30) Foreign Application Priority Data

Sep. 7, 2009 (TW) ................................ 98130065 A (51) Int. Cl.
*G06F 3/041* (2006.01)
(52) U.S. Cl. ...................... 345/173; 178/18.01; 257/360; 345/174; 349/40
(58) Field of Classification Search .......... 345/173–178; 178/18.01; 257/355–360; 349/40
See application file for complete search history.

(56) References Cited

U.S. PATENT DOCUMENTS

| | | | | |
|---|---|---|---|---|
| 5,648,642 A | * | 7/1997 | Miller et al. | 178/18.06 |
| 5,677,745 A | * | 10/1997 | Kawano et al. | 349/42 |
| 5,929,829 A | * | 7/1999 | Pitt | 345/87 |
| 6,114,862 A | | 9/2000 | Tartagni et al. | |
| 6,346,739 B1 | * | 2/2002 | Lepert et al. | 257/532 |
| 6,583,841 B2 | * | 6/2003 | Youn et al. | 349/141 |
| 6,686,546 B2 | * | 2/2004 | Chiu | 178/18.01 |
| 6,900,644 B2 | * | 5/2005 | Chou et al. | 324/661 |

(Continued)

FOREIGN PATENT DOCUMENTS

CN 1581480 2/2005

(Continued)

OTHER PUBLICATIONS

"1st Office Action of China Counterpart Application", issued on Dec. 1, 2010, p. 1-p. 9, in which the listed referents were cited.

*Primary Examiner* — Lun-Yi Lao
*Assistant Examiner* — Gregory J Tryder
(74) *Attorney, Agent, or Firm* — Jianq Chyun IP Office (57) ABSTRACT

A touch panel including a substrate, a plurality of first sensing series, and a plurality of second sensing series is provided. The first sensing series and the second sensing series are disposed on the substrate. The first sensing series extend along a first direction and are electrically insulated from each other. Each of the first sensing series includes a plurality of first sensing pads and a plurality of first bridge portions connected between the first sensing pads. The second sensing series extend along a second direction and are electrically insulated from each other. Each of the second sensing series includes a plurality of second sensing pads and a plurality of second bridge portions connected between the second sensing pads. Each of the first bridge portions and one of the second bridge portions are intersected, and at least one of the second bridge portions has at least one electrostatic discharge tip.

16 Claims, 12 Drawing Sheets

U.S. PATENT DOCUMENTS

| | | | |
|---|---|---|---|
| 7,009,410 B2 * | 3/2006 | Ito et al. | 324/690 |
| 7,158,194 B2 | 1/2007 | Lo et al. | |
| 7,332,379 B2 | 2/2008 | Chen et al. | |
| 7,545,621 B2 * | 6/2009 | Haddad | 361/220 |
| 7,612,837 B2 * | 11/2009 | Lo et al. | 349/40 |
| 7,839,459 B2 * | 11/2010 | Lee | 349/40 |
| 2005/0023614 A1 * | 2/2005 | Lai | 257/360 |
| 2006/0092591 A1 * | 5/2006 | Yuan et al. | 361/91.1 |
| 2006/0097991 A1 * | 5/2006 | Hotelling et al. | 345/173 |
| 2007/0240914 A1 * | 10/2007 | Lai et al. | 178/18.06 |
| 2008/0174238 A1 * | 7/2008 | Jeong et al. | 313/504 |
| 2008/0179112 A1 * | 7/2008 | Qin et al. | 178/18.06 |
| 2008/0180591 A1 * | 7/2008 | Shie | 349/40 |
| 2008/0309633 A1 * | 12/2008 | Hotelling et al. | 345/173 |
| 2009/0262094 A1 * | 10/2009 | Lin | 345/174 |

FOREIGN PATENT DOCUMENTS

| | | |
|---|---|---|
| CN | 101359265 | 2/2009 |
| TW | I220313 | 8/2004 |

* cited by examiner

TOUCH PANEL

CROSS-REFERENCE TO RELATED APPLICATION

This application claims the priority benefit of Taiwan application serial no. 98130065, filed on Sep. 7, 2009. The entirety of the above-mentioned patent application is hereby incorporated by reference herein and made a part of specification.

BACKGROUND OF THE DISCLOSURE

1. Technical Field

The disclosure relates to a touch panel, and in particular relates to a touch panel having a favorable capability of electrostatic discharge (ESD) protection.

2. Description of Related Art

Based on different sensing methods, touch panels can be categorized into the following types: resistive touch panel, capacitive touch panel, optical touch panel, acoustic-wave touch panel, and electromagnetic touch panel. A capacitive touch panel is characterized by short response speed, good reliability, satisfactory durability, and so forth. Therefore, capacitive touch panels have been extensively applied in various kinds of electronic products. In view of structures and manufacturing methods, capacitive touch panels can be further classified into an additive type and an integrated/in-cell type. In an additive-type capacitive touch panel, sensing series are first formed on a substrate, and the substrate having the sensing series thereon is then adhered to an outer surface of a display. As a consequence, the additive-type touch panel inevitably has a certain thickness. Compared with the additive-type touch panel, an integrated/in-cell type touch panel is more conducive to the slimness and lightness of the display.

However, in terms of fabrication, the integrated/in-cell type touch panel and the additive-type touch panel both encounter the problem of low yield rate resulting from electrostatic discharge. Such a problem is especially crucial to the integrated/in-cell type touch panel. For instance, most of the current integrated/in-cell type touch panels are fabricated by forming a touch-control circuit on one surface of the substrate and then forming a color filter thin film on the other surface of the substrate. While the color filter thin film is being formed, the touch-control circuit is often damaged due to electrostatic discharge. Moreover, when the user touches the integrated/in-cell type touch panel and the additive-type touch with his/her finger, electrostatic discharge may also occur, resulting in the damage of the touch-control circuit.

Since electrostatic discharge is inevitable during the fabrication and use of the touch panel, how to enhance the touch panel's protection against electrostatic discharge is one of the important issues that all designers seek to overcome.

SUMMARY OF THE DISCLOSURE

The disclosure provides a touch panel having a favorable capability of electrostatic discharge (ESD) protection.

The disclosure provides a touch panel, including a substrate, a plurality of first sensing series, and a plurality of second sensing series. The first sensing series are disposed on the substrate. Moreover, the first sensing series extend along a first direction and are electrically insulated from one another. Each of the first sensing series includes a plurality of first sensing pads and a plurality of first bridge portions, wherein each of the first bridge portions is electrically connected between two neighboring first sensing pads. The second sensing series are disposed on the substrate. In addition, the second sensing series extend along a second direction and are electrically insulated from one another. Each of the second sensing series includes a plurality of second sensing pads and a plurality of second bridge portions, and each of the second bridge portions is electrically connected between two neighboring second sensing pads. Furthermore, each of the second bridge portions intersects one of the first bridge portions, and at least one of the second bridge portions has at least an electrostatic discharge tip.

The disclosure provides another touch panel, including a substrate, a plurality of first sensing series, and a plurality of second sensing series. The first sensing series are disposed on the substrate. Moreover, the first sensing series extend along a first direction and are electrically insulated from one another. Each of the first sensing series includes a plurality of first sensing pads, a plurality of first bridge portions, and at least a first electrostatic discharge tip, wherein each of the first bridge portions is electrically connected between two neighboring first sensing pads. The second sensing series are disposed on the substrate. In addition, the second sensing series extend along a second direction and are electrically insulated from one another. Each of the second sensing series includes a plurality of second sensing pads and a plurality of second bridge portions, wherein each of the second bridge portions is electrically connected between two neighboring second sensing pads. The first electrostatic discharge tip extends from an edge of the first sensing pad in one of the first sensing series toward an edge of one of the first sensing pads in the neighboring first sensing series.

The disclosure further provides another touch panel, including a substrate, a plurality of first sensing series, and a plurality of second sensing series. The first sensing series are disposed on the substrate. Moreover, the first sensing series extend along a first direction and are electrically insulated from one another, wherein each of the first sensing series includes a plurality of first sensing pads and a plurality of first bridge portions. Each of the first bridge portions is electrically connected between two neighboring first sensing pads. The second sensing series are disposed on the substrate. In addition, the second sensing series extend along a second direction and are electrically insulated from one another. Each of the second sensing series includes a plurality of second sensing pads, a plurality of second bridge portions, and at least an electrostatic discharge tip. Each of the second bridge portions is electrically connected between two neighboring second sensing pads. Furthermore, the electrostatic discharge tip extends from an edge of the second sensing pad in one of the second sensing series toward one of the first bridge portions.

The disclosure further provides a touch panel, including a substrate, a plurality of first sensing series, a plurality of second sensing series, and at least a third electrostatic discharge tip. The first sensing series are disposed on the substrate, wherein the first sensing series extend along a first direction and are electrically insulated from one another. Each of the first sensing series includes a plurality of first sensing pads and a plurality of first bridge portions, wherein each of the first bridge portions is electrically connected between two neighboring first sensing pads. The second sensing series are disposed on the substrate, wherein the second sensing series extend along a second direction and are electrically insulated from one another. Each of the second sensing series includes a plurality of second sensing pads and a plurality of second bridge portions, wherein each of the second bridge portions is electrically connected between two neighboring second sensing pads. The third electrostatic discharge tip extends from an edge of the first sensing pad in one of the first sensing series toward an edge of one of the second sensing pads in the neighboring second sensing series, and the third electrostatic discharge tip is electrically connected with one of the first sensing pads or one of the second sensing pads.

Because the disclosure adopts the electrostatic discharge tip that is connected with the sensing series, the touch panel provides favorable electrostatic discharge protection.

In order to make the aforementioned and other features and advantages of the disclosure more comprehensible, several embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

First Embodiment

Figure 1:
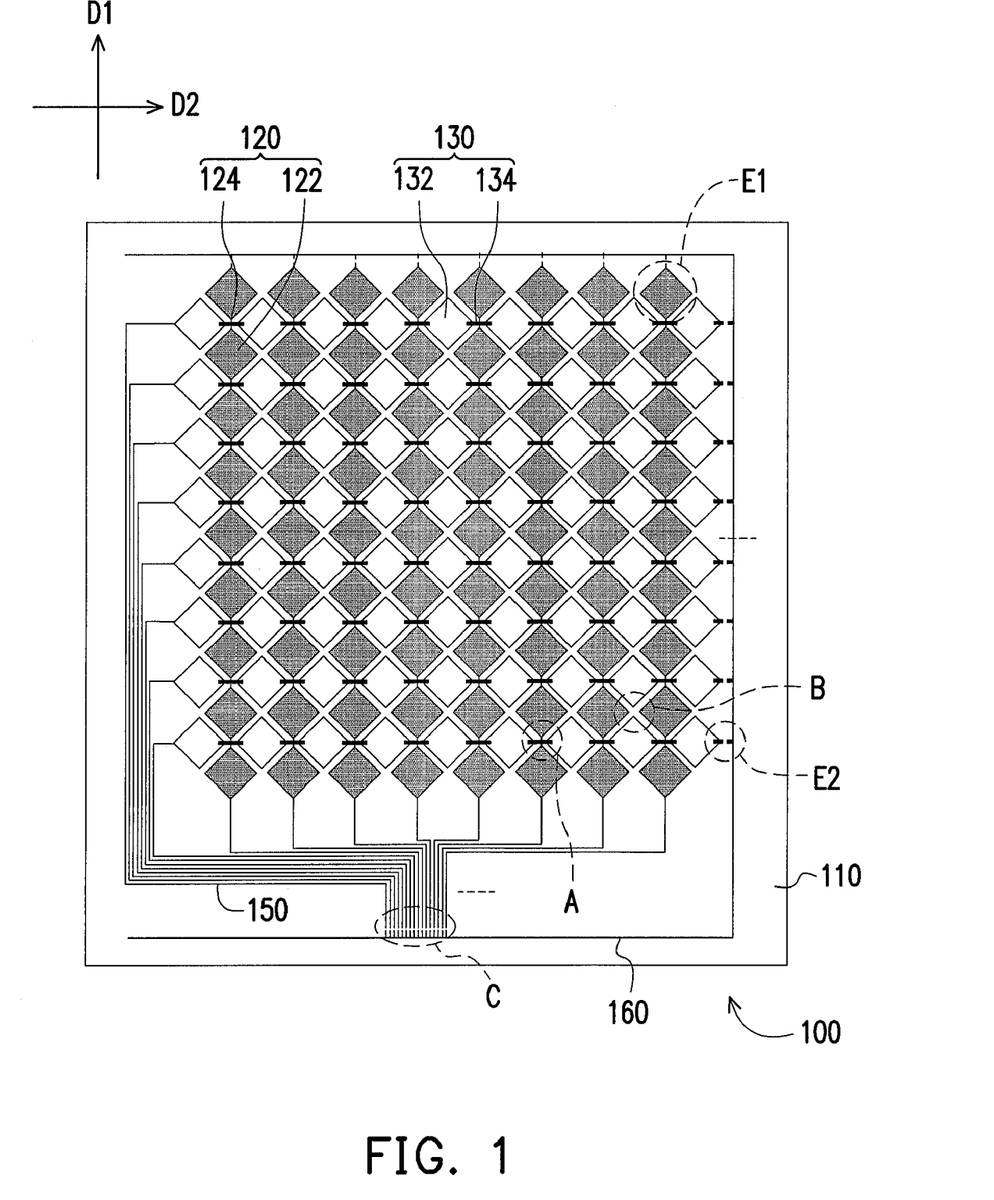
FIG. 1 is a schematic view of a touch panel according to the first embodiment of the disclosure.
Figure 2A:
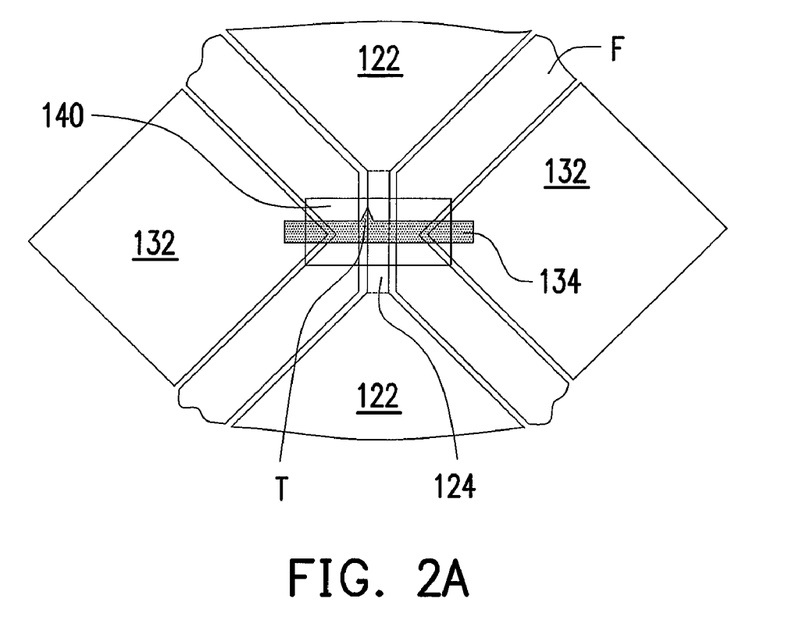
FIGS. 2A~2C are enlarged views of an area A in FIG. 1.
Figure 2B:
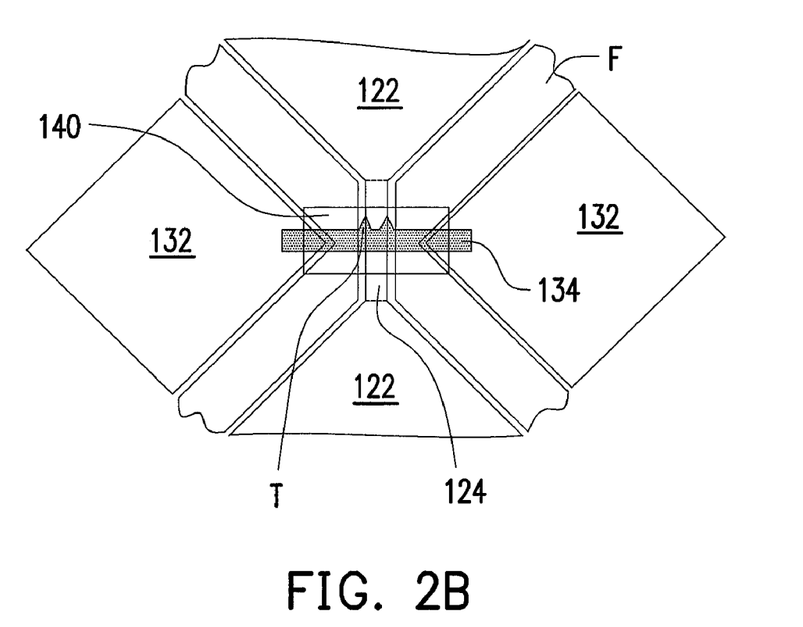
Figure 2C:
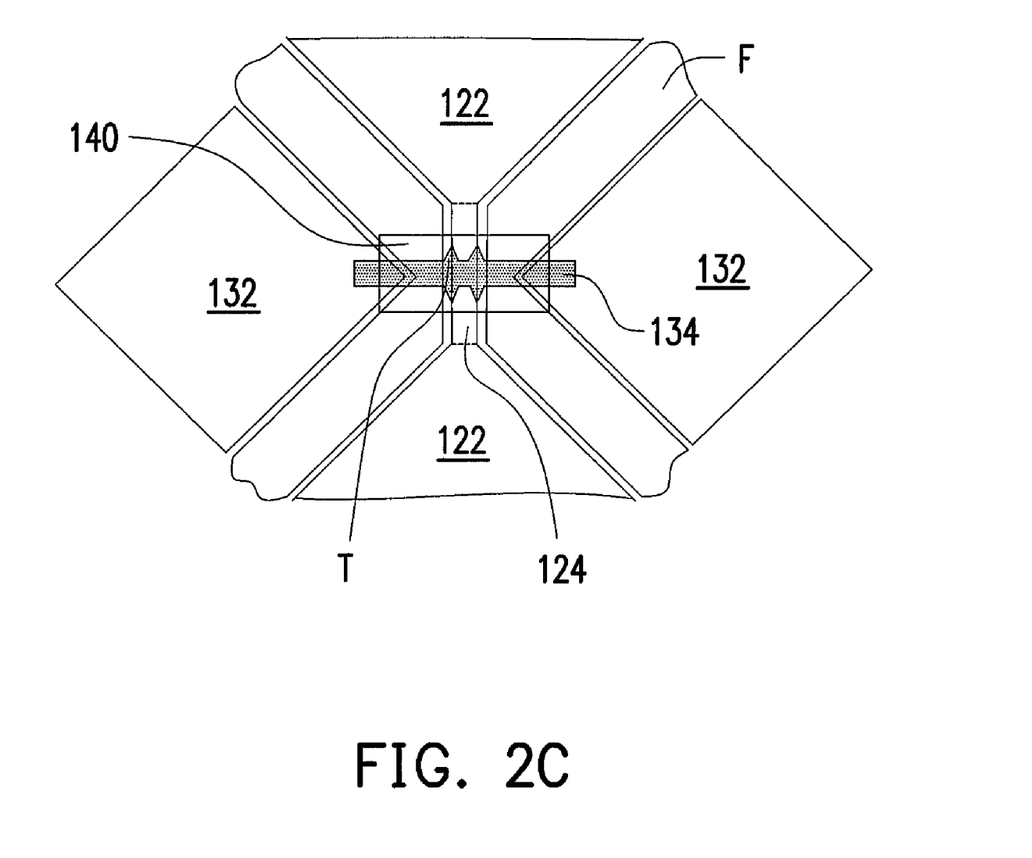

FIG. 1 is a schematic view of a touch panel according to the first embodiment of the disclosure, and FIGS. 2A~2C are enlarged views of an area A in FIG. 1. Referring to FIGS. 1 and 2A, a touch panel 100 described in this embodiment includes a substrate 110, a plurality of first sensing series 120, and a plurality of second sensing series 130. The first sensing series 120 are disposed on the substrate 110. Moreover, the first sensing series 120 extend along a first direction D1 and are electrically insulated from one another. In this embodiment, each of the first sensing series 120 includes a plurality of first sensing pads 122 and a plurality of the first bridge portions 124, wherein each of the first bridge portions 124 is electrically connected between two neighboring first sensing pads 122. The second sensing series 130 are also disposed on the substrate 110. In addition, the second sensing series 130 extend along a second direction D2 and are electrically insulated from one another. In this embodiment, each of the second sensing series 130 includes a plurality of second sensing pads 132 and a plurality of the second bridge portions 134, wherein each of the second bridge portions 134 is electrically connected between two neighboring second sensing pads 132. It is noted that each of the second bridge portions 134 respectively intersects one of the first bridge portions 124, and at least one of the second bridge portions 134 has at least an electrostatic discharge tip T (as shown in FIG. 2A). In this embodiment, a shape of the electrostatic discharge tip T can be an isosceles triangle, a right-angled triangle, or any other geometric shaped for enhancing partial electric field strength.

As shown in FIG. 1, because the first sensing series 120 and the second sensing series 130 respectively extend along the first direction D1 and the second direction D2, and the first direction D1 is different from the second direction D2, each of the first sensing series 120 respectively intersects a plurality of the second sensing series 130. According to this embodiment, the first direction D1 and the second direction D2 are perpendicular to each other. However, the disclosure does not limit the first direction D1 to be perpendicular to the second direction D2. In other words, the first direction D1 can be any direction different from the second direction D2. A shape of the first sensing pads 122 and the second sensing pads 132 is, for example, square, rhombus, or any other shaped that can be regularly arranged. In addition, the first sensing pads 122 and the second sensing pads 132 do not overlap each other.

Referring to FIG. 2A, in this embodiment, the first sensing pads 122, the first bridge portions 124, and the second sensing pads 132 are formed by the same material. Specifically, the first sensing pads 122, the first bridge portions 124, and the second sensing pads 132 can be formed by a transparent conductive material, such as indium tin oxide (ITO), indium zinc oxide (IZO) or other suitable materials. A material of the second bridge portions 134 can be metal or alloy. Because the first sensing pads 122, the first bridge portions 124, and the second sensing pads 132 are formed by the same material, the first sensing pads 122, the first bridge portions 124, and the second sensing pads 132 are fabricated by one photolithography etching process (PEP). It is noted that the materials of the first sensing pads 122, the first bridge portions 124, the second sensing pads 132, and the second bridge portions 134 may vary to meet actual requirements. Therefore, the disclosure does not limit the materials used for forming the first sensing pads 122, the first bridge portions 124, the second sensing pads 132, and the second bridge portions 134.

In addition to the above, the touch panel 100 of this embodiment further includes a floating conductive layer F located between the first sensing pads 120 and the second sensing pads 130. The floating conductive layer F is electrically insulated from the first sensing pads 120 and the second sensing pads 130. The floating conductive layer F is conducive to reducing cross-talk between the first sensing pads 120 and the second sensing pads 130. Similarly, the first sensing pads 122, the first bridge portions 124, the second sensing pads 132, and the floating conductive layer F can be formed by a transparent conductive material, such as indium tin oxide (ITO), indium zinc oxide, or other suitable materials. Since the first sensing pads 122, the first bridge portions 124, the second sensing pads 132, and the floating conductive layer F are formed by the same material, the first sensing pads 122, the first bridge portions 124, the second sensing pads 132, and the floating conductive layer F can be fabricated by one photolithography etching process (PEP).

In this embodiment, the electrostatic discharge tip T is aligned to an edge of one of the first bridge portions 124. When the electrostatic discharge tip T is aligned to the edge of the first bridge portion 124, an electrostatic discharge phenomenon is easily confined at the electrostatic discharge tip T. Because the second bridge portion 134 has a larger line width at the electrostatic discharge tip T, when electrostatic discharge phenomenon occurs at the electrostatic discharge tip T, the second bridge portion 134 would not be disconnected easily. It is known from the above that the electrostatic discharge tip T is conducive to preventing the disconnection of the second bridge portions 134, further to increasing a life time of the touch panel 100.

According to the illustration of FIG. 2A, one of the second bridge portions 134 has one electrostatic discharge tip T.

However, the disclosure does not limit the number of the electrostatic discharge tip T. The second bridge portions 134 can have a plurality of electrostatic discharge tips T, as depicted in FIGS. 2B and 2C.

Figure 3A:
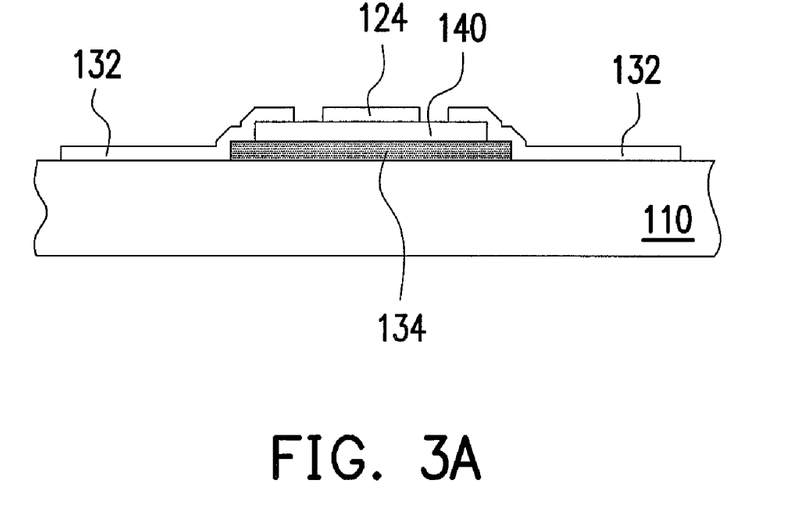
FIGS. 3A~3B are cross-sectional views of the area A in FIG. 1.

In this embodiment, the second bridge portions 134 connecting between the second sensing pads 132 are formed before the fabrication of the first sensing pads 122, the first bridge portions 124, and the second sensing pads 132. Thus, the second sensing pads 132 cover two ends of the second bridge portions 134 and are electrically connected with the two ends of the second bridge portions 134. To prevent short circuit between the first bridge portions 124 and the second bridge portions 134 which intersect each other, a patterned dielectric layer 140 is disposed between the first bridge portions 124 and the second bridge portions 134. The patterned dielectric layer 140 covers a partial area of the second bridge portions 134 and exposes the two ends of the second bridge portions 134, so as to allow the second bridge portions 134 to electrically connect the second sensing pads 132, as shown in FIG. 3A.

Figure 3B:
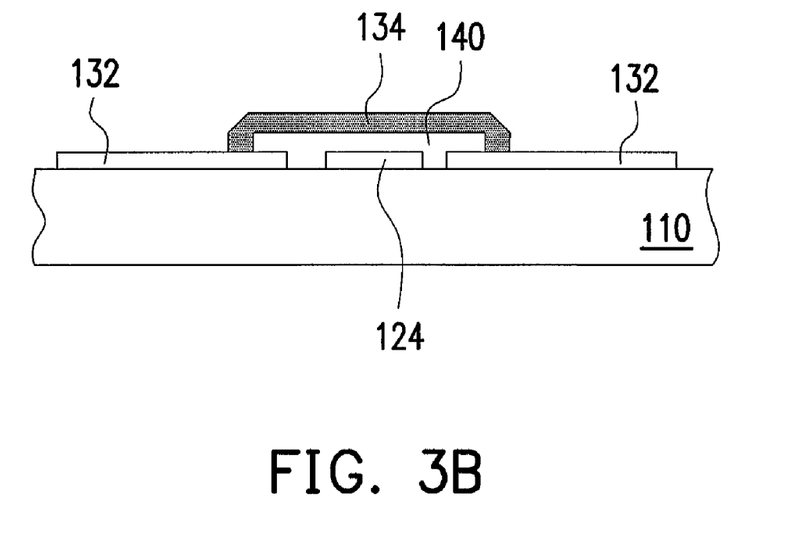

It is noted that the second bridge portions 134 can also be formed after the fabrication of the first sensing pads 122, the first bridge portions 124, and the second sensing pads 132. To be more detailed, the patterned dielectric layer 140 covers a partial area of the first bridge portions 124, and the second bridge portions 134 are disposed above the patterned dielectric layer 140. The two ends of the second bridge portions 134 exceed an edge of the patterned dielectric layer 140 and are electrically connected with the second bridge portions 134 on two sides, as shown in FIG. 3B.

Figure 4A:
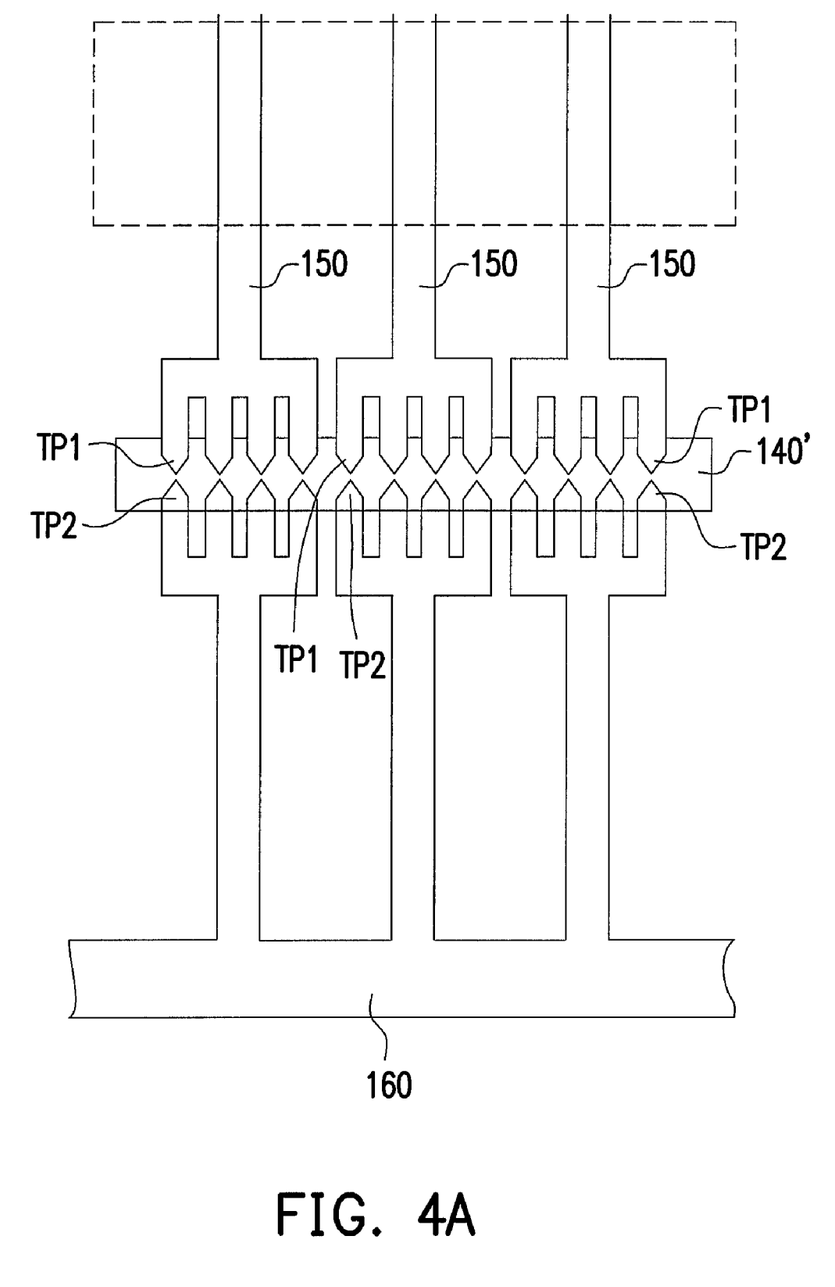
FIG. 4A is an enlarged view of an area C in FIG. 1.

FIG. 4A is an enlarged view of an area C in FIG. 1. Referring to FIGS. 1 and 4A, the touch panel 100 of this embodiment further includes a plurality of sensing signal transmission lines 150 and an electrostatic release line 160. Each of the sensing signal transmission lines 150 is electrically connected with one of the first sensing series 120 or one of the second sensing series 130, and an end of each of the sensing signal transmission lines 150 has at least a first tip TP1. Moreover, the electrostatic release line 160 has at least a second tip TP2 that is aligned to the first tip TP1 in a tip-to-tip way. The first tip TP1 and the second tip TP2 are separated by a patterned dielectric layer 140'. Because the first tip TP1 and the second tip TP2 are aligned to each other in a tip-to-tip way, when electrostatic discharge phenomenon occurs in the first sensing series 120 or the second sensing series 130, the design of the first tip TP1 and the second tip TP2 promptly and effectively transmits static electricity from the sensing signal transmission lines 150 to the electrostatic release line 160. In this embodiment, the electrostatic release line 160 is, for example, a ground ring.

Figure 4B:
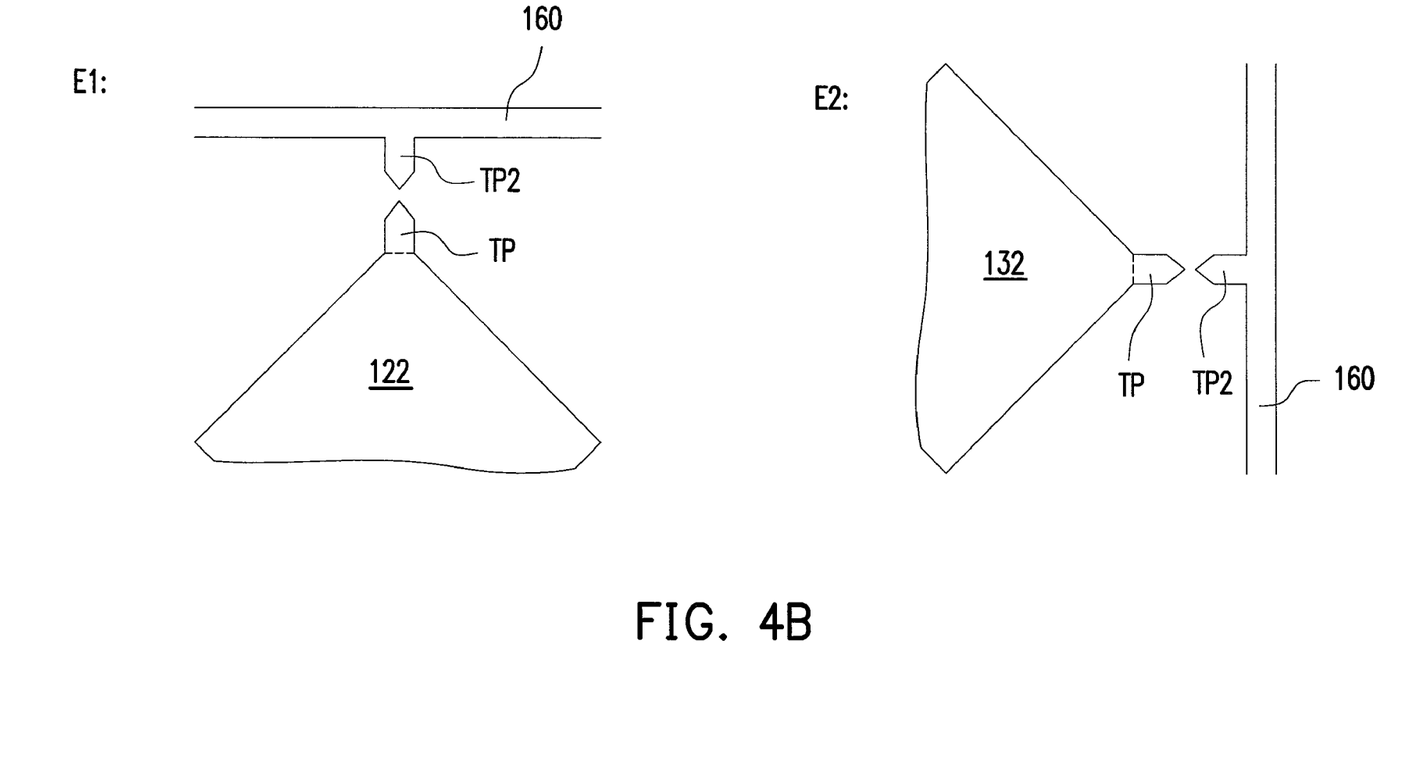
FIG. 4B illustrates enlarged views of areas E1 and E2 in FIG. 1.

FIG. 4B illustrates enlarged views of areas E1 and E2 in FIG. 1. With reference to FIGS. 1 and 4B, in the touch panel 100 of this embodiment, each of the first sensing series 120 and the second sensing series 130 respectively has an edge tip TP. The edge tip TP is aligned to the second tip TP2 of the electrostatic release line 160 in a tip-to-tip way.

Figure 5A:
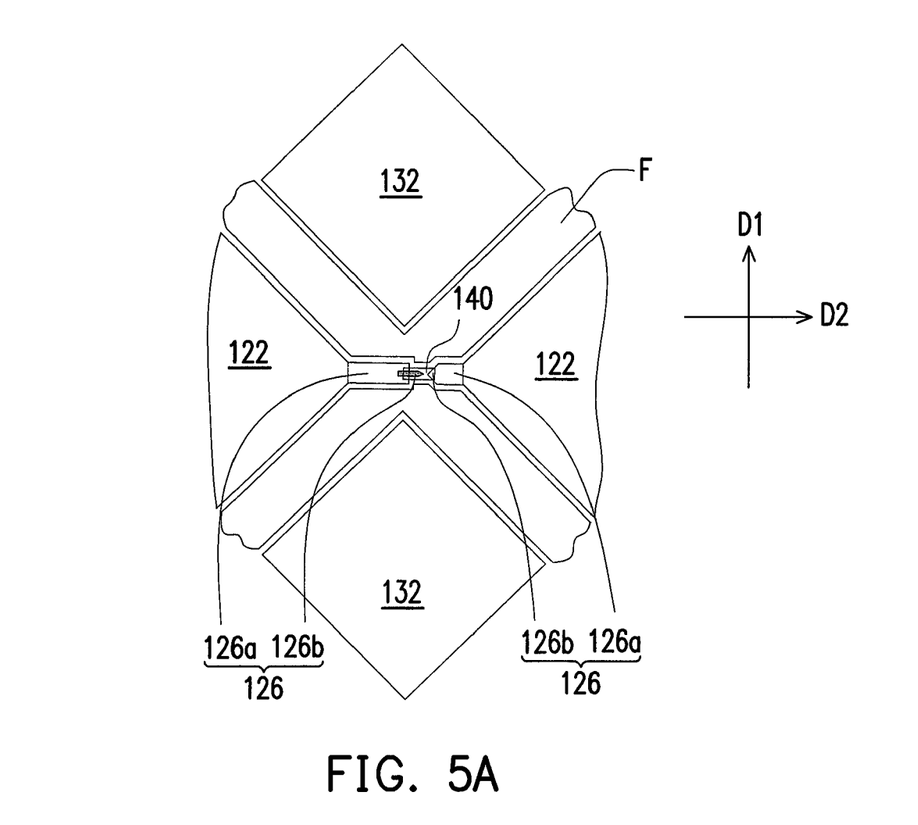
FIGS. 5A~5D are enlarged views of an area B in FIG. 1.
Figure 5B:
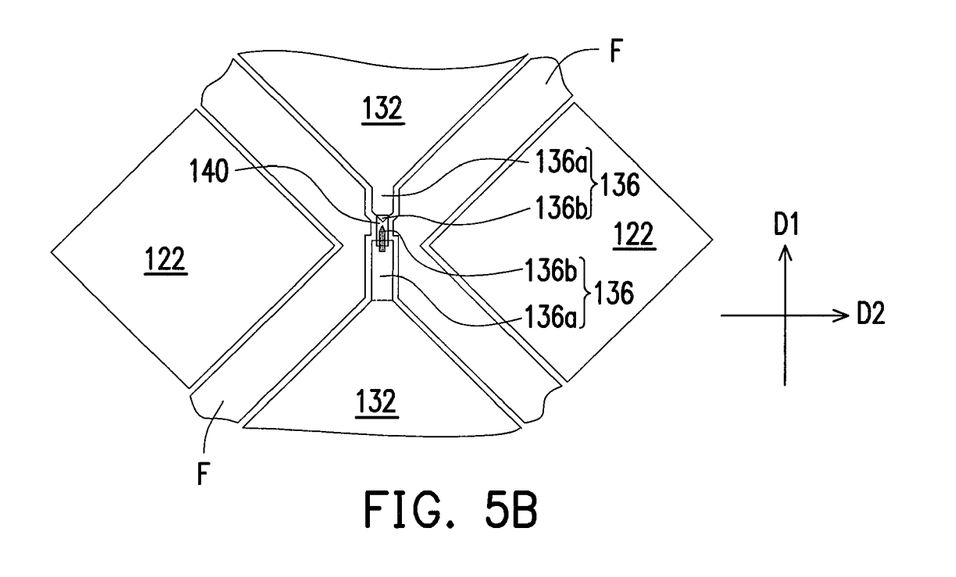
Figure 5C:
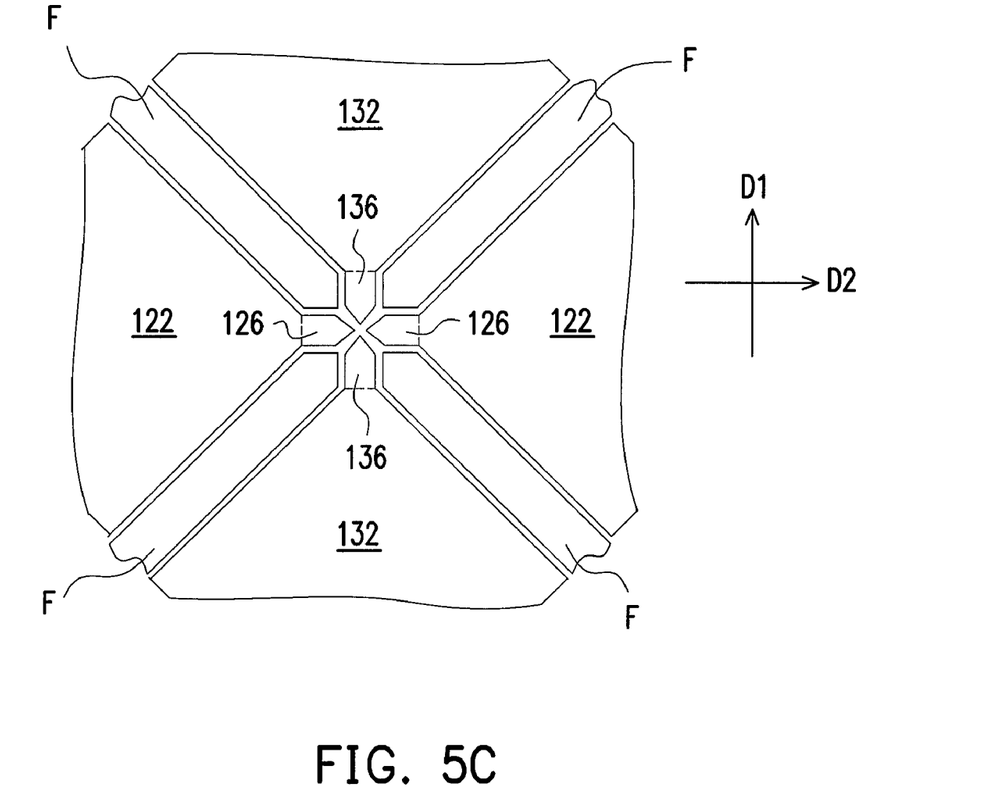
Figure 5D:
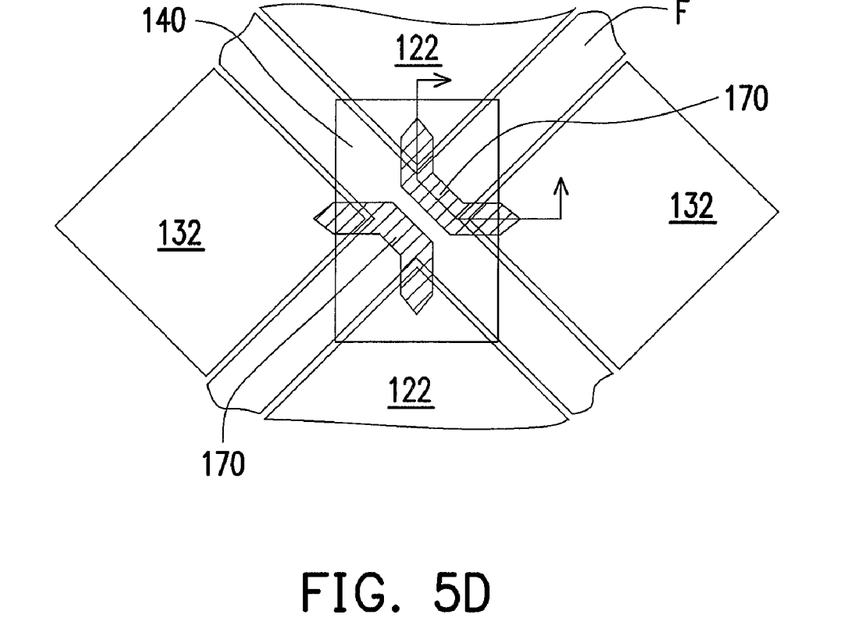
Figure 5E:
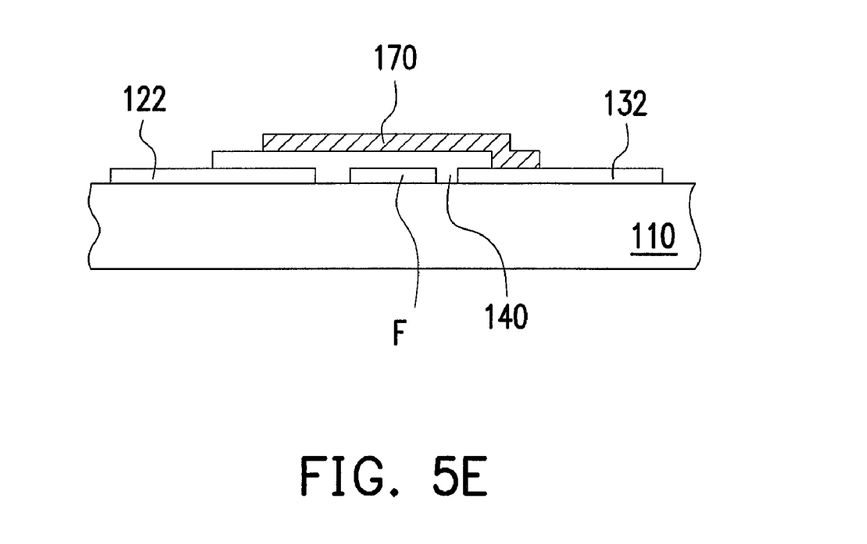
FIG. 5E is a cross-sectional view of the area B in FIG. 1.

FIGS. 5A~5D are enlarged views of an area B in FIG. 1, and FIG. 5E is a cross-sectional view of the area B in FIG. 1. Referring to FIGS. 1 and 5A, in this embodiment, each of the first sensing series 120 includes a plurality of first sensing pads 122, a plurality of first bridge portions 124, and at least a first electrostatic discharge tip 126, wherein each of the first bridge portions 124 is electrically connected between two neighboring first sensing pads 122. The first electrostatic discharge tip 126 extends from an edge of the first sensing pad 122 in one of the first sensing series 120 toward an edge of the first sensing pad 122 in the neighboring first sensing series 120. More specifically, neighboring first electrostatic discharge tips 126 in different first sensing series 120 are aligned to each other, and an extending direction of the first electrostatic discharge tips 126 is parallel to the second direction D2.

Further to the above, the first electrostatic discharge tip 126 includes a first extending portion 126a and a first tip portion 126b. The first extending portion 126a extends from the edge of the first sensing pad 122 toward the first sensing pad 122 in the neighboring first sensing series 120. The first tip portion 126b is connected with the first extending portion 126a, and the first tip portion 126b extends from an edge of the first extending portion 126a toward the neighboring first sensing series 120. The first extending portion 126a and the first tip portion 126b can be formed by the same material or formed by different materials. FIG. 5A illustrates both of the foregoing situations. In the situation that the first extending portion 126a and the first tip portion 126b are formed by different materials, the first sensing pads 122 and the first extending portion 126a are formed by a transparent conductive material, and the first tip portion 126b is formed by a metal, for example. It is noted that the materials of the first extending portion 126a and the first tip portion 126b may vary to meet actual requirements. The disclosure does not limit the materials used for forming the first extending portion 126a and the first tip portion 126b.

With reference to FIG. 5B, in other embodiments of the disclosure, each of the second sensing series 130 includes a plurality of second sensing pads 132, a plurality of second bridge portions 134, and at least a second electrostatic discharge tip 136. The second electrostatic discharge tip 136 extends from an edge of one of the second sensing pads 132 toward the neighboring second sensing series 130. Specifically, neighboring second electrostatic discharge tips 136 in different second sensing series 130 are aligned to each other, and an extending direction of the second electrostatic discharge tips 136 is parallel to the first direction D1.

The second electrostatic discharge tip 136 includes a second extending portion 136a and a second tip portion 136b. The second extending portion 136a extends from the edge of one of the second sensing pad 132 toward the neighboring second sensing series 132. The second tip portion 136b is connected with the second extending portion 136a, and the second tip portion 136b extends from an edge of the second extending portion 136b toward the neighboring second sensing series 130. The second extending portion 136a and the second tip portion 136b can be formed by the same material or formed by different materials. FIG. 5B illustrates both of the foregoing situations. In the situation that the second extending portion 136a and the second tip portion 136b are formed by different materials, the second sensing pads 132 and the second extending portion 136a are formed by a transparent conductive material, and the second tip portion 136b is formed by a metal, for example. It is noted that the materials of the second extending portion 136a and the second tip portion 136b may vary to meet actual requirements. The disclosure does not limit the materials used for forming the second extending portion 136a and the second tip portion 136b.

Moreover, a patterned dielectric layer 140 can be disposed between two neighboring second tip portions 136b, as shown in FIG. 5A, to electrically insulate the second tip portions 136b.

Referring to FIG. 5C, the first electrostatic discharge tip 126 and the second electrostatic discharge tip 136 described in the above can coexist. Because the first electrostatic discharge tip 126 discharges to the other first electrostatic discharge tip 126 and two second electrostatic discharge tips 136, or the second electrostatic discharge tip 136 discharges to the other second electrostatic discharge tip 136 and two first electrostatic discharge tips 126, the above-described layout design accelerates the discharge of static electricity.

Referring to FIGS. 5D and 5E, the design of a third electrostatic discharge tip 170 is adopted in some other embodiments of the disclosure, wherein the third electrostatic discharge tip 170 extends from the edge of the first sensing pad 122 in one of the first sensing series 120 toward the edge of one of the second sensing pads 132 in the neighboring second sensing series 130, and the third electrostatic discharge tip 170 is electrically connected with one of the first sensing pads 122 or one of the second sensing pads 132. FIGS. 5D and 5E illustrate that the third electrostatic discharge tip 170 is electrically connected with one of the second sensing pads 132.

It is known from FIG. 5E that the third electrostatic discharge tip 170 is, for example, distributed over the patterned dielectric layer 140 and extends from the patterned dielectric layer 140 toward the second sensing pad 132. However, the third electrostatic discharge tip 170 does not extend from the patterned dielectric layer 140 toward the first sensing pads 122.

Second Embodiment

Figure 6:
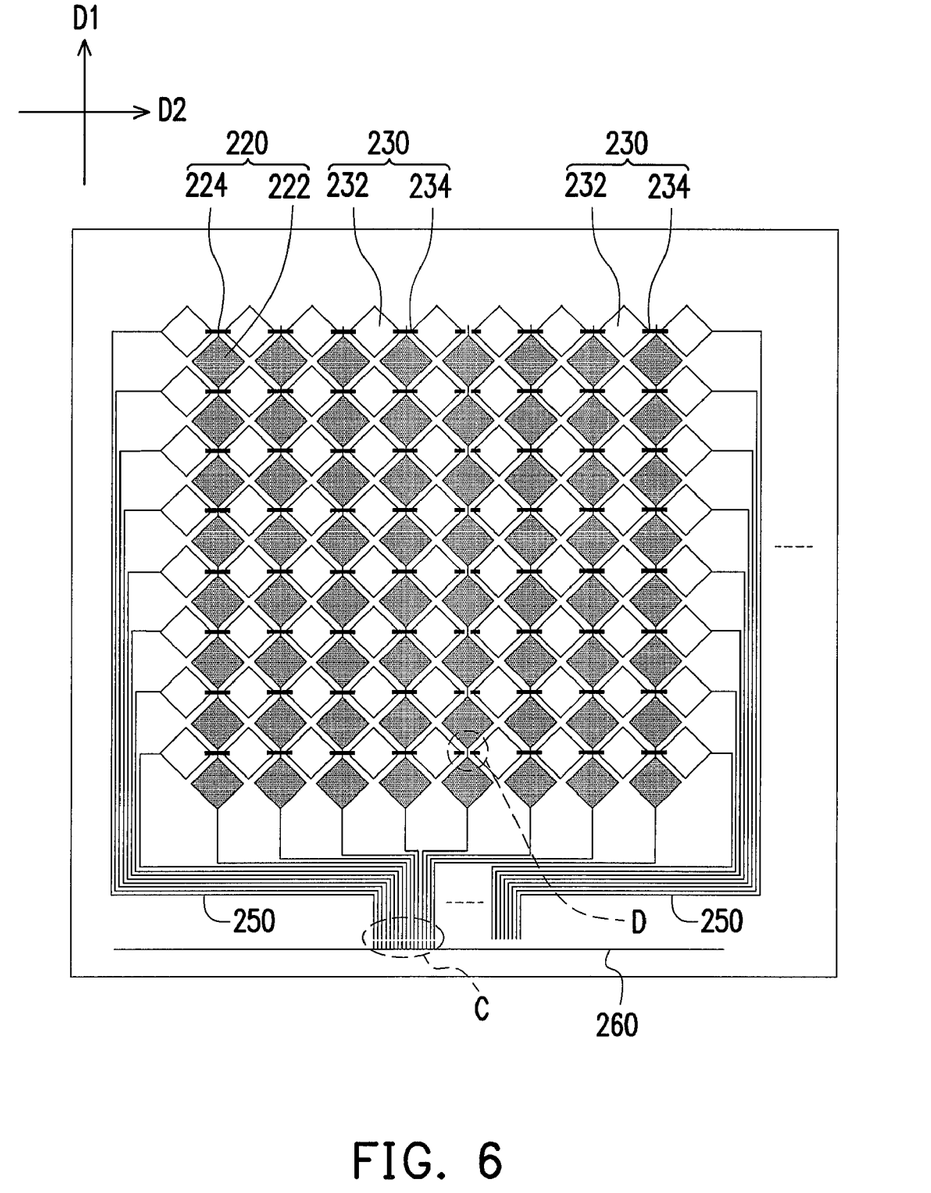
FIG. 6 is a schematic view of a touch panel according to the second embodiment of the disclosure.

FIG. 6 is a schematic view of a touch panel according to the second embodiment of the disclosure. Referring to FIG. 6, in a touch panel 200 of this embodiment, second sensing series 230 which are arranged in a row can be divided into two second sensing series 230, wherein the second sensing series 230 on the left are electrically connected with a sensing signal transmission line 250 disposed on the left side, and the second sensing series 230 on the right are electrically connected with a sensing signal transmission line 250 disposed on the right side. To be more specific, the second sensing series 230 are divided into two groups which are respectively electrically connected with two groups of sensing signal transmission lines 250.

Figure 7A:
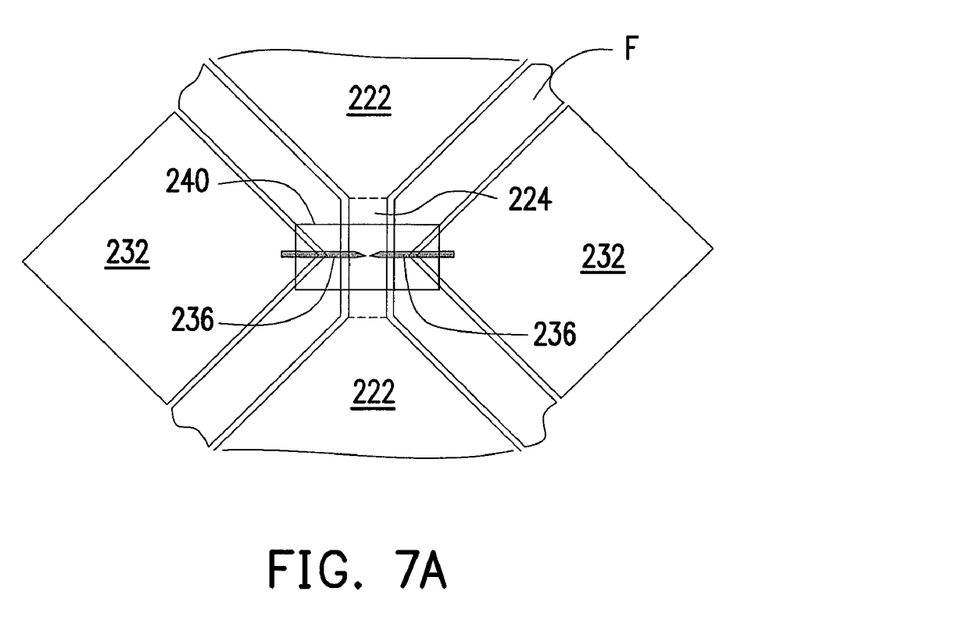
FIGS. 7A~7C are enlarged views of an area D in FIG. 6.
Figure 7B:
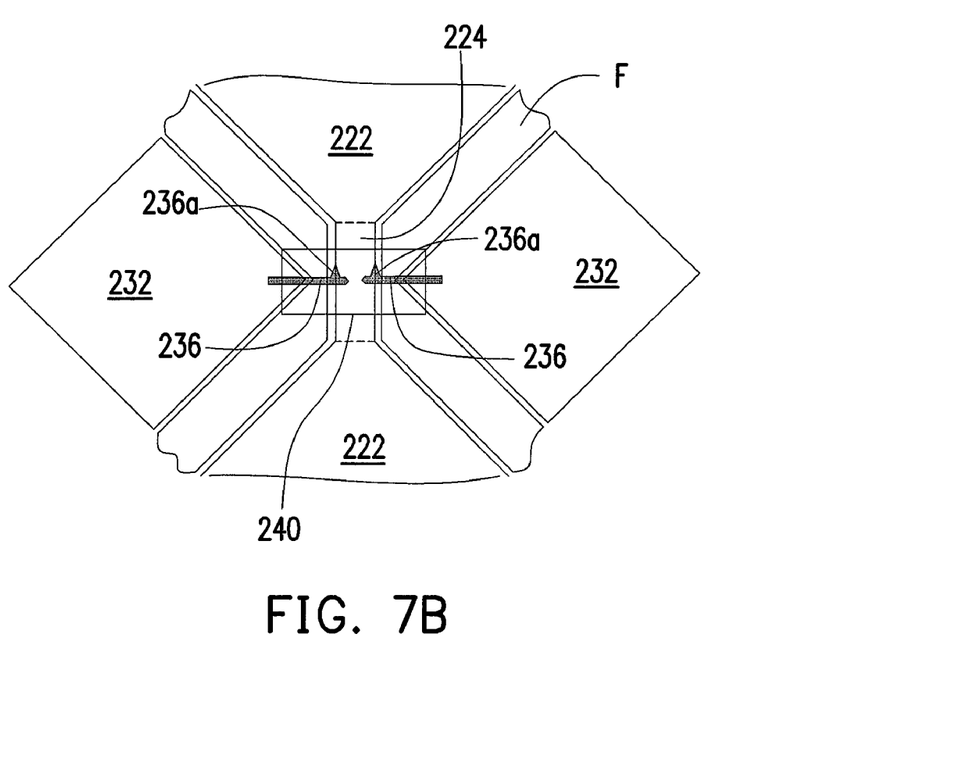
Figure 7C:
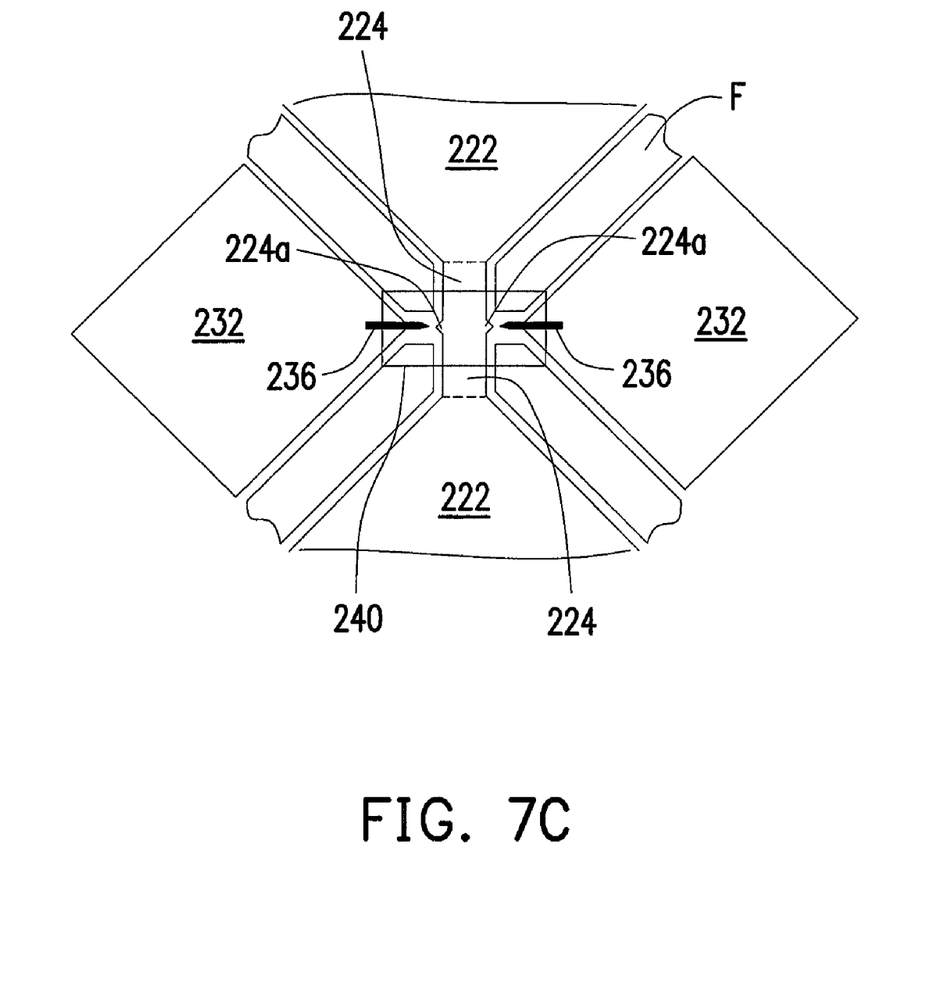

FIGS. 7A~7C are enlarged views of an area D in FIG. 6. Referring to FIGS. 6 and 7A, the touch panel 200 described in this embodiment includes a substrate 210, a plurality of first sensing series 220, and a plurality of the second sensing series 230. The first sensing series 220 are disposed on the substrate 210. Moreover, the first sensing series 220 extend along a first direction D1 and are electrically insulated from one another, wherein each of the first sensing series 220 includes a plurality of first sensing pads 222 and a plurality of first bridge portions 224. Each of the first bridge portions 224 is electrically connected between two neighboring first sensing pads 222. The second sensing series 230 are disposed on the substrate 210. In addition, the second sensing series 230 extend along a second direction D2 and are electrically insulated from one another. Each of the second sensing series 230 includes a plurality of second sensing pads 232, a plurality of second bridge portions 234, and at least an electrostatic discharge tip 236, wherein each of the second bridge portions 234 is electrically connected between two neighboring second sensing pads 232. It is noted that the electrostatic discharge tip 236 is located at a boundary between the two groups of the second sensing series 230.

As clearly shown in FIG. 7A, the electrostatic discharge tip 236 extends from an edge of the second sensing pad 232 in one of the second sensing series 230 toward one of the first bridge portions 224. The electrostatic discharge tip 236 extends above or under the second bridge portion 224, for example. The electrostatic discharge tip 236 and the second bridge portion 224 are aligned to each other in a tip-to-tip way. In addition, a patterned dielectric layer 240 can be disposed between the electrostatic discharge tip 236 and the second bridge portion 224, so as to prevent short circuit between the electrostatic discharge tip 236 and the second bridge portion 224.

With reference to FIG. 7B, in this embodiment, the electrostatic discharge tip 236 has at least a lateral tip 236a aligned to the edge of the first bridge portion 224. It is known from the illustration of FIG. 7B that the electrostatic discharge tip 236 and the lateral tip 236a provide more electrostatic discharge paths for discharging static electricity more quickly and effectively.

Referring to FIG. 7C, in this embodiment, the first bridge portion 224 has at least a tip 224a positioned aligned to the electrostatic discharge tip 236 in a tip-to-tip way.

Further to the above, the design disclosed in FIGS. 4A and 4B can be combined with the design disclosed in FIGS. 5A~5D. The design disclosed in FIGS. 4A and 4B can also be combined with the design disclosed in FIGS. 7A~7C. In additional, each one of the first sensing series 120, 220 and each one of the second sensing series 130, 230 is electrically insulated from each other in the above-mentioned embodiments of the disclosure.

In view of the foregoing, because tips are disposed at different positions in the touch panel of the disclosure, static electricity is discharged from the touch panel more quickly and effectively. As a consequence, the life time of the touch panel is increased.

Although the disclosure has been described with reference to the above embodiments, it is apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A touch panel, comprising:
a substrate;
a plurality of first sensing series disposed on the substrate, the first sensing series extending along a first direction and being electrically insulated from one another, each of the first sensing series comprising:
a plurality of first sensing pads;
a plurality of first bridge portions, each of the first bridge portions being electrically connected between two neighboring first sensing pads; and
at least a first electrostatic discharge tip extending from an edge of the first sensing pad in one of the first sensing series toward an edge of one of the first sensing pads in the neighboring first sensing series, wherein at least a portion of the first electrostatic discharge tip is formed by a layer different to the first sensing pad in the one of the first sensing series; and
a plurality of second sensing series disposed on the substrate, the second sensing series extending along a second direction and being electrically insulated from one another, each of the second sensing series comprising:
a plurality of second sensing pads; and
a plurality of second bridge portions, each of the second bridge portions being electrically connected between two neighboring second sensing pads.

2. The touch panel as claimed in claim 1, wherein the first electrostatic discharge tip comprises:
a first extending portion extending from an edge of one of the first sensing pads toward the neighboring first sensing series; and
a first tip portion connected with the first extending portion and formed by the layer different to the extending portion, wherein the first tip portion extends from an edge of the first extending portion toward the neighboring first sensing series.

3. The touch panel as claimed in claim 1, wherein each of the second sensing series further comprises:
   at least a second electrostatic discharge tip extending from an edge of one of the second sensing pads toward the neighboring second sensing series.

4. The touch panel as claimed in claim 3, wherein the second electrostatic discharge tip comprises:
   a second extending portion extending from an edge of one of the second sensing pads toward the neighboring second sensing series; and
   a second tip portion connected with the second extending portion, wherein the second tip portion extends from an edge of the second extending portion toward the neighboring second sensing series.

5. The touch panel as claimed in claim 1 further comprising:
   a plurality of sensing signal transmission lines, each of the sensing signal transmission lines is electrically connected with one of the first sensing series or one of the second sensing series, wherein an end of each of the sensing signal transmission lines has at least a first tip; and
   an electrostatic release line having at least a second tip, wherein the first tip and the second tip are aligned to each other in a tip-to-tip way.

6. The touch panel as claimed in claim 1 further comprising a floating conductive layer disposed between the first sensing pads and the second sensing pads, wherein the floating conductive layer is electrically insulated from the first sensing pads and the second sensing pads.

7. The touch panel as claimed in claim 1 further comprising an electrostatic release line having at least a tip, wherein each of the first sensing series and each of the second sensing series respectively has an edge tip, and the edge tip is aligned to the tip in a tip-to-tip way.

8. A touch panel, comprising:
   a substrate;
   a plurality of first sensing series disposed on the substrate, the first sensing series extending along a first direction and being electrically insulated from one another, each of the first sensing series comprising:
      a plurality of first sensing pads;
      a plurality of first bridge portions, each of the first bridge portions being electrically connected between two neighboring first sensing pads; and
   a plurality of second sensing series disposed on the substrate, the second sensing series extending along a second direction and being electrically insulated from one another, each of the second sensing series comprising:
      a plurality of second sensing pads; and
      a plurality of second bridge portions, each of the second bridge portions being electrically connected between two neighboring second sensing pads;
   at least an electrostatic discharge tip extending from an edge of the second sensing pad in one of the second sensing series toward one of the first bridge portions, wherein the electrostatic discharge tip is formed by a layer different to the second sensing pad and the first bridge portions.

9. The touch panel as claimed in claim 8, wherein the first bridge portion has at least a tip, and the tip is aligned to the electrostatic discharge tip in a tip-to-tip way.

10. The touch panel as claimed in claim 8, wherein the electrostatic discharge tip extends above or under one of the first bridge portions.

11. The touch panel as claimed in claim 8, wherein the electrostatic discharge tip has at least a lateral tip aligned to an edge of the first bridge portion.

12. The touch panel as claimed in claim 8 further comprising an electrostatic release line having at least a tip, wherein each of the first sensing series and each of the second sensing series respectively has an edge tip, and the edge tip is aligned to the tip in a tip-to-tip way.

13. A touch panel, comprising:
   a substrate;
   a plurality of first sensing series disposed on the substrate, the first sensing series extending along a first direction and being electrically insulated from one another, each of the first sensing series comprising:
      a plurality of first sensing pads;
      a plurality of first bridge portions, each of the first bridge portions being electrically connected between two neighboring first sensing pads;
   a plurality of second sensing series disposed on the substrate, the second sensing series extending along a second direction and being electrically insulated from one another, each of the second sensing series comprising:
      a plurality of second sensing pads;
      a plurality of second bridge portions, each of the second bridge portions being electrically connected between two neighboring second sensing pads; and
   at least a third electrostatic discharge tip extending from an edge of the first sensing pad in one of the first sensing series toward an edge of one of the second sensing pads in the neighboring second sensing series, wherein the third electrostatic discharge tip is electrically connected with one of the first sensing pads or one of the second sensing pads and the third electrostatic discharge tip is formed by a layer different from the one of the first sensing pads and the one of the second sensing pads.

14. The touch panel as claimed in claim 13 further comprising:
   a plurality of sensing signal transmission lines, each of the sensing signal transmission lines is electrically connected with one of the first sensing series or one of the second sensing series, wherein an end of each of the sensing signal transmission lines has at least a first tip; and
   an electrostatic release line having at least a second tip, wherein the first tip and the second tip are aligned to each other in a tip-to-tip way.

15. The touch panel as claimed in claim 13 further comprising a floating conductive layer disposed between the first sensing pads and the second sensing pads, wherein the floating conductive layer is electrically insulated from the first sensing pads and the second sensing pads.

16. The touch panel as claimed in claim 13 further comprising an electrostatic release line having at least a tip, wherein each of the first sensing series and each of the second sensing series respectively has an edge tip, and the edge tip is aligned to the tip in a tip-to-tip way.

\* \* \* \* \*